(12) United States Patent
Winner et al.

(10) Patent No.: US 6,816,105 B2
(45) Date of Patent: Nov. 9, 2004

(54) VEHICLE SURVEILLANCE SYSTEM

(76) Inventors: Karl Winner, 52 Poplar Dr., Home Valey, WA (US) 98648; Benjamin Khen, 2003 Sherman St., Hood River, OR (US) 97031

( * ) Notice: Subject to any disclaimer, the term of this patent is extended or adjusted under 35 U.S.C. 154(b) by 0 days.

(21) Appl. No.: 10/275,934
(22) PCT Filed: May 9, 2001
(86) PCT No.: PCT/US01/14883
§ 371 (c)(1), (2), (4) Date: Nov. 8, 2002
(87) PCT Pub. No.: WO01/86319
PCT Pub. Date: Nov. 15, 2001

(65) Prior Publication Data
US 2003/0142002 A1 Jul. 31, 2003

Related U.S. Application Data
(60) Provisional application No. 60/203,039, filed on May 9, 2000.

(51) Int. Cl.[7] .......................... G13S 13/06; G13S 13/74; G13S 13/93
(52) U.S. Cl. .............................. 342/37; 342/29; 342/30; 342/32; 342/36; 342/118; 342/146; 342/147; 342/195; 342/450
(58) Field of Search ................................. 701/300–302; 342/455, 27–40, 42–51, 118, 125–128, 133–135, 139, 140, 145, 146, 147, 157, 158, 175, 195, 450, 451, 453, 463–465, 59, 55, 424, 442, 462

(56) References Cited

U.S. PATENT DOCUMENTS

| | | | | |
|---|---|---|---|---|
| 2,857,592 A | * | 10/1958 | Hoffman | 342/44 |
| 3,161,870 A | * | 12/1964 | Pincoffs | 342/59 |
| 3,487,462 A | * | 12/1969 | Holberg | 342/59 |
| 3,626,411 A | * | 12/1971 | Litchford | 342/32 |
| 3,735,408 A | * | 5/1973 | Litchford | 342/32 |
| 3,757,324 A | * | 9/1973 | Litchford | 342/32 |
| 3,858,210 A | * | 12/1974 | Litchford | 342/32 |
| 3,858,211 A | * | 12/1974 | Litchford | 342/147 |
| 3,875,570 A | * | 4/1975 | Litchford | 342/32 |
| 3,895,382 A | * | 7/1975 | Litchford | 342/32 |
| 4,027,307 A | * | 5/1977 | Litchford | 342/32 |
| RE29,260 E | * | 6/1977 | Litchford | 342/147 |
| 4,642,648 A | * | 2/1987 | Hulland et al. | 342/455 |
| 4,733,241 A | * | 3/1988 | Litchford et al. | 342/453 |
| 4,751,511 A | * | 6/1988 | Komata et al. | 342/59 |
| 4,768,036 A | * | 8/1988 | Litchford et al. | 342/455 |
| 4,789,865 A | * | 12/1988 | Litchford | 342/455 |
| 4,910,526 A | * | 3/1990 | Donnangelo et al. | 342/32 |
| 5,075,694 A | * | 12/1991 | Donnangelo et al. | 342/32 |
| 5,077,673 A | * | 12/1991 | Brodegard et al. | 701/301 |
| 5,227,803 A | * | 7/1993 | O'Connor et al. | 342/442 |
| 5,252,980 A | * | 10/1993 | Gray et al. | 342/59 |
| 5,302,955 A | * | 4/1994 | Schutte et al. | 342/59 |
| 5,302,957 A | * | 4/1994 | Franzen | 342/125 |
| 5,410,314 A | * | 4/1995 | Frush et al. | 342/59 X |
| 5,579,009 A | * | 11/1996 | Nilsson-Almqvist et al. | 342/55 |
| 5,812,091 A | * | 9/1998 | Robinson | 342/424 |
| 6,222,487 B1 | * | 4/2001 | Ahlbom et al. | 342/462 |
| 6,359,583 B1 | * | 3/2002 | Shamee | 342/33 |
| 6,377,204 B1 | * | 4/2002 | Wurman et al. | 342/59 |

* cited by examiner

*Primary Examiner*—Bernarr E. Gregory
(74) *Attorney, Agent, or Firm*—Benesch Friedlander Coplan & Aronoff LLP

(57) ABSTRACT

An algorithm for improved tracking of Air Traffic Control Radar Beacon System transponders is disclosed. The algorithm can be combined with a system that includes an interrogator which transmits an interrogation signal to an associated vehicle transponder at a first frequency, preferably 1030 MHZ in accordance with FAA regulations, and a receiver array which receives the transponder reply signal transmitted by the transponder at a second frequency, preferably 1090 MHZ in accordance with FAA regulations. An angle of arrival processor calculates an angle of the received reply signal, and a position processor calculates the vehicle position based on at least the received angle data.

19 Claims, 7 Drawing Sheets

VEHICLE SURVEILLANCE SYSTEM

CROSS-REFERENCE TO RELATED APPLICATION

This application claims priority under 35 U.S.C. section 119(e) from U.S. Provisional Application No. 60/203,039 filed on May 9, 2000.

BACKGROUND OF THE INVENTION

The present application relates to the detection and tracking of aircraft. The invention finds particular application in detecting and tracking suitably equipped aircraft on an airport surface, aircraft on closely spaced parallel approaches and aircraft in proximity of an airport and will be described with reference thereto. It is to be appreciated however, that the teachings disclosed herein are also amenable to the detection and tracking of suitably equipped vehicles in a variety of environments such as highway, maritime and other applications.

The position of aircraft near airports and other aircraft is of crucial importance to the safe movement of aircraft Multiple techniques which make use of the Air Traffic Control Radar Beacon System (ATCRBS) transponders have previously been employed to track and monitor airborne aircraft enroute to an airport, provide guidance or monitor aircraft on final approach to airports and monitor aircraft movement within the airports runways and taxiways. The tracking techniques have been realized in the following systems.

Airborne aircraft enroute to an airport are monitored using Air Traffic Control Beacon Interrogator (ATCBI-6) ground systems and associated displays. These systems interrogate Mode A/C and are fully compliant with the new Mode S (for selective) transponder formats that include P4 suppression to reduce synchronous garble.

Traffic Collision And Avoidance System (TCAS) is operated onboard aircraft to interrogate aircraft transponders and measure time of arrival (TOA) and in some cases angle of arrival (AOA), then track display and issue resolution advisories when aircraft closure criteria exceed certain thresholds, as taught In U.S. Pat. No. 5,387,915 issued on 7 Feb., 1995 to Moussa et el.

The Transponder Landing System (TLS) provide means for the pilot to monitor aircraft position with respect to the desired course and glide path, on final approach to an airport. The system relies on Mode A/C interrogations to track the transponder.

Systems are known which monitor aircraft on the surface of an airport based only on time of arrival multilateration of the aircraft transponder response, and some prototype multilateration systems have been fielded which rely heavily on the new Mode S transponder, as taught in U.S. Pat. No. 5,262,784 issued on 16 Nov., 1993 to Drobnicki et el.

The fundamental design constraint of all of the above systems for which the transponder reply is the basis of positive identification is the desire for the system to operate during periods of synchronous garble. Garbling of transponder replies occurs where positive identification of the aircraft transponder response is thwarted by overlapping transponder replies from aircraft that are near the same slant distance from the ground sensor. To increase the capacity of the transponder based systems and minimize synchronous garble, the new Mode S has been defined and standardized. All aircraft with more than 30 seats are now equipped with Mode S transponders and TCAS. In contrast to normal Secondary Surveillance Radar (SSR), some features of the SSR Mode S make it very suitable for ground traffic control as well. The problems in cooperative ground detection tracking methods are due to the lack of Mode S transponders in general aviation aircraft. This problem is likely to persist for many years. For reliably detecting aircraft within dense RF environments which include Mode A/C transponders, new methods must be developed.

The present invention provides an improved method and apparatus for measuring and processing aircraft transponder replies degraded by synchronous garble which overcomes problems with the current techniques used by the above-referenced systems and others.

SUMMARY OF THE INVENTION

In accordance with one embodiment of the present invention, a method of tracking aircraft in a surveillance area includes a conventional IFF transponder responsive to interrogation signals at a first frequency, receiving reply signals from aircraft in the surveillance area at a second frequency, the signals being received on a plurality of antenna arrays. An angle of the received reply signals is determined relative to each array from the differential carrier phase. A range is determined based on the time of arrival (TOA) measurement, which is the time from signal transmission to reception. These and other characteristics of the reply signals, such as amplitude and frequency, are used to correlate pulses with each other over time. A position is calculated for each reply pulse indicative of an origin or source point of the reply signals from data including the determined angle and range. This Pulse Track data is conveyed to a central processing location. Pulse tracks are then correlated between multiple ground sensors using all track states which include reply amplitude, position (point of reply origin), velocity, acceleration and reply frequency (waveform cycles per second), to yield an aircraft position and ID. A single array may not be able to calculate a unique angle, but TOA measurements from multiple antenna arrays can be used to calculate a unique angle. This is accomplished by using the TOA data from 2 non-co-located arrays to calculate an initial position and then selecting the angle with the lowest residual. Further processing of the data allows the ultimate system accuracy to be achieved by solving for aircraft position estimates based on intersecting two or more lines of bearing. This final step in the transponder reply processing eliminates the transponder encoding delay. Data representative of a plurality of calculated positions is periodically provided to vehicles in the surveillance area or other users such as ground or air traffic controllers.

In accordance with another aspect of the present invention, a system for locating an object within a monitored area which receives and measures at least two angles from at least two separate sensor locations without external interrogation of the transponder, commonly referred to as a transponder Mode S squitter.

In accordance with another aspect of the present invention, Angle of arrival data is measured on every reply pulse to improve pulse to pulse correlation. A position can be calculated for each pulse and combined with velocity, acceleration, reply amplitude and reply signal frequency, can be used to associate pulses over time. This provides synchronous garble mitigation, as the entire reply is not needed to provide position and ID.

In accordance with an aspect of the present invention, the angle is determined by determining at least one of an elevation angle and an azimuth angle.

In accordance with an aspect of the present invention, the method further includes receiving the provided data representative of a plurality of calculated positions in a particular vehicle, for example, an aircraft either airborne or taxiing, or airport service vehicles. From the received data a position corresponding to the particular vehicle is extracted and compared with another position from onboard sensors.

In accordance with an aspect of the present invention, the angle of each reply pulse is determined by receiving the reply signal on a reference antenna in the array and receiving the reply signal on another antenna in the array. A difference in phase between the signal received on the reference antenna and the signal received on the other antenna is determined.

In accordance with an aspect of the present invention, the method of tracking reply pulses in a surveillance area further includes calculating an elapsed time between transmitting an interrogation signal and receiving the reply signal and determining a range based on the elapsed time.

In accordance with an embodiment of the present invention, an apparatus which detects aircraft in an area and includes an angle determining apparatus, a range determining apparatus, a position processor and a transmitter. The angle determining apparatus includes a plurality of antennas disposed as an array, and a phase calculator which calculates a difference in phase of the reply signal between a first receive channel including a first antenna, and a second receive channel including a second antenna. The range determining apparatus includes a synchronized timer which determines a time between the interrogation signal and receipt of the transponder reply signal at each of the plurality of antennas, and a range estimator which estimates a range based on the determined time between the interrogation signal and receipt of the transponder reply signal. The position processor determines a position based on the calculated difference in phase and the estimated range. The transmitter transmits data including positions representative of a plurality of aircraft in the area.

In accordance with an aspect of the present invention, the apparatus also includes a second angle determining apparatus in data communication with the position processor which determines a position based on the calculated difference in phase and the second calculated difference in phase.

In accordance with an embodiment of the present invention, a system for locating a cooperative object within a monitored area includes an interrogator which transmits an interrogation signal at a frequency. First and second arrays receive a reply signal transmitted by a transponder. An angle of arrival processor calculates an angle of the received reply signal relative to the first and second arrays, and a position processor calculates a position based on data including the calculated angle of the received reply signal.

In accordance with an aspect of the present invention, the system further includes a display in communication with the position processor which graphically depicts the calculated position.

In accordance with an aspect of the present invention, the system further includes an identification processor in communication with the sensor which determines an identification associated with the object based upon information encoded in the transponder reply signal.

In accordance with an aspect of the present invention, the system further includes a range processor which determines a range of the transponder from the ground station based on the received reply signal.

In accordance with an aspect of the present invention, the system further includes means for otherwise detecting objects in the monitored area and displaying detected objects simultaneously.

In accordance with an aspect of the present invention, the number of arrays is at least two, and the arrays are non-linearly disposed.

In accordance with an aspect of the present invention, the system further includes a broadcaster which broadcasts a plurality of calculated positions throughout the monitored area.

In accordance with another embodiment of the present invention, a system for locating a vehicle within a monitored area, includes at least one receiver array which receives a reply signal transmitted by a transponder associated with the vehicle. A range processor calculates a range based on the received reply signal and an angle of arrival processor calculates an angle of the received reply signal. A position processor calculates a vehicle position based upon the range and the angle.

In accordance with an aspect of the present invention, the range processor includes a time of arrival processor which calculates an elapsed time between a reference time and a time the reply signal is received at the receiver array, where the range is determined from the elapsed time at the receiver.

In accordance with an aspect of the present invention, the reference time includes receipt of a timing signal at the receiver.

In accordance with an aspect of the present invention, the angle of arrival processor extracts an in phase (I) component and a quadrature (Q) component of the signal, and further calculates an azimuth based on the in phase and quadrature components.

In accordance with an aspect of the present invention, the receiver array includes two adjacent closely spaced antenna elements to provide a coarse azimuth calculation, and two non-adjacent antenna elements linearly disposed with the adjacent elements to provide a fine azimuth calculation.

In accordance with another embodiment of the present invention, a method of determining a position of a cooperative object in a monitored area, includes receiving an encoded reply signal at a frequency from the cooperative object transmitted in response to an interrogation signal at another frequency. A line of bearing is calculated from characteristics of the received reply signal, the line of bearing relative to a plurality of antenna elements forming an array. A second solution is calculated based on receipt of the reply signal, and a position is determined based on the line of bearing and the second solution.

In accordance with another aspect of the present invention, the characteristics of the received reply signal from which the line of bearing is calculated include a spatial phase distribution of the reply signal.

One advantage of the present invention resides in the use of legacy equipment to provide a more reliable and accurate navigation solution during synchronous garble events.

Another advantage of the present invention resides in the use of AOA data to provide the most efficient use of each interrogation and or transponder reply in an environment where it is extremely important to minimize interrogations, and as a consequence minimize the occurrence of garble.

Another advantage of the present invention resides in the increased situational awareness of both pilots and ground-based controllers.

Another advantage of the present invention resides in the application of the present teachings to any transponder based navigation applications such as TCAS, Parallel Runway Monitoring, TLS, or airborne and ground surveillance.

Still further advantages will become apparent to those of ordinary skill in the art upon reading and understanding and following detailed description.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
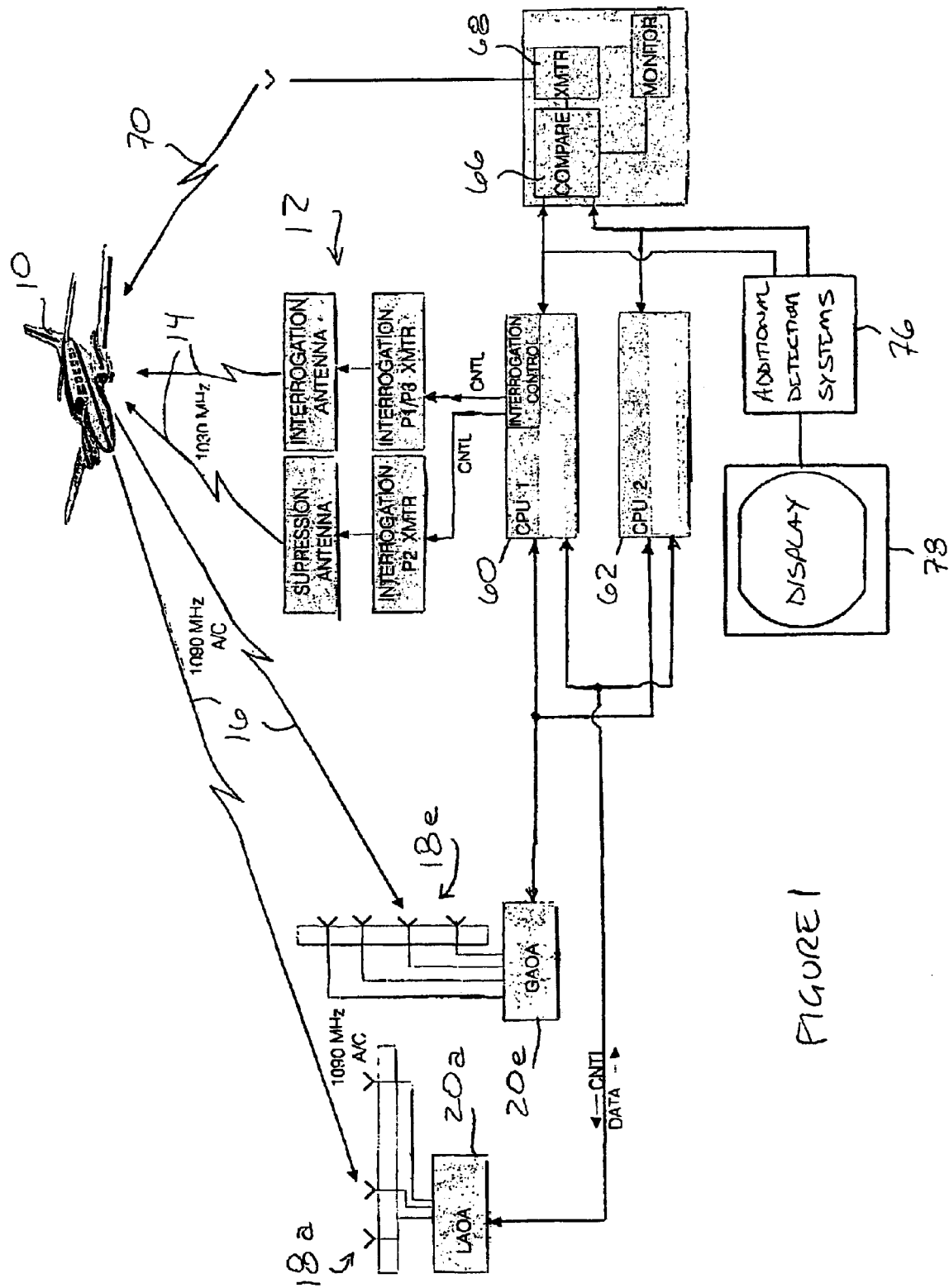
FIG. 1 is a block diagram of a system suitable to practice an embodiment of the present invention.

With reference to FIG. 1, an aircraft 10 or other vehicle with an associated transponder (not shown) is interrogated by interrogator 12. In compliance with Federal Aviation Administration (FAA) regulations, this interrogation signal 14 is preferably transmitted at 1030 MHZ, although other frequencies may also be used and may be desirable in environments other than tracking airborne aircraft. Interrogation strategies to reduce synchronous garble may include those well known in the art such as directional antenna lobbing using either phased array or fixed directional parabolic antenna or the like, and or whisper shout interrogation amplitude sequences, well known in Traffic Collision Avoidance System (TCAS) applications. Other interrogation beam shapes including a wide area beam, phased array and the like are also contemplated.

In response, the transponder sends a transponder reply 16 which preferably complies with FAA regulations specifying 1090 MHZ. This signal is depicted in FIG. 1 as two separate beams, but the transponder preferably acts as an approximate point source with signal preferably emitting omni-directionally and extending throughout the monitored area.

Transponder signal 16 is received by a plurality of receiver arrays, in FIG. 1 shown as two arrays, one to determine azimuth $18_a$ and one to determine elevation $18_e$. While these arrays are shown separately, those skilled in the art will appreciate that they may be combined on a frame or support in a "L" configuration or alternately, a phased array type panel may employed with no loss of functionality. The discrete arrays $18_a$, $18_e$ are illustrated for clarity only. As used herein, the term "array" should include receivers capable of determining azimuth only, elevation only, range only or combinations thereof. The received signal of each antenna is processed by an angle of arrival processor $20_a$, $20_e$ to determine various characteristics such as time (for example, between transmission and reception), amplitude, frequency, differential carrier phase, and/or angle of the reply signal 16 from the source transponder with respect to the array 18.

Figure 2:
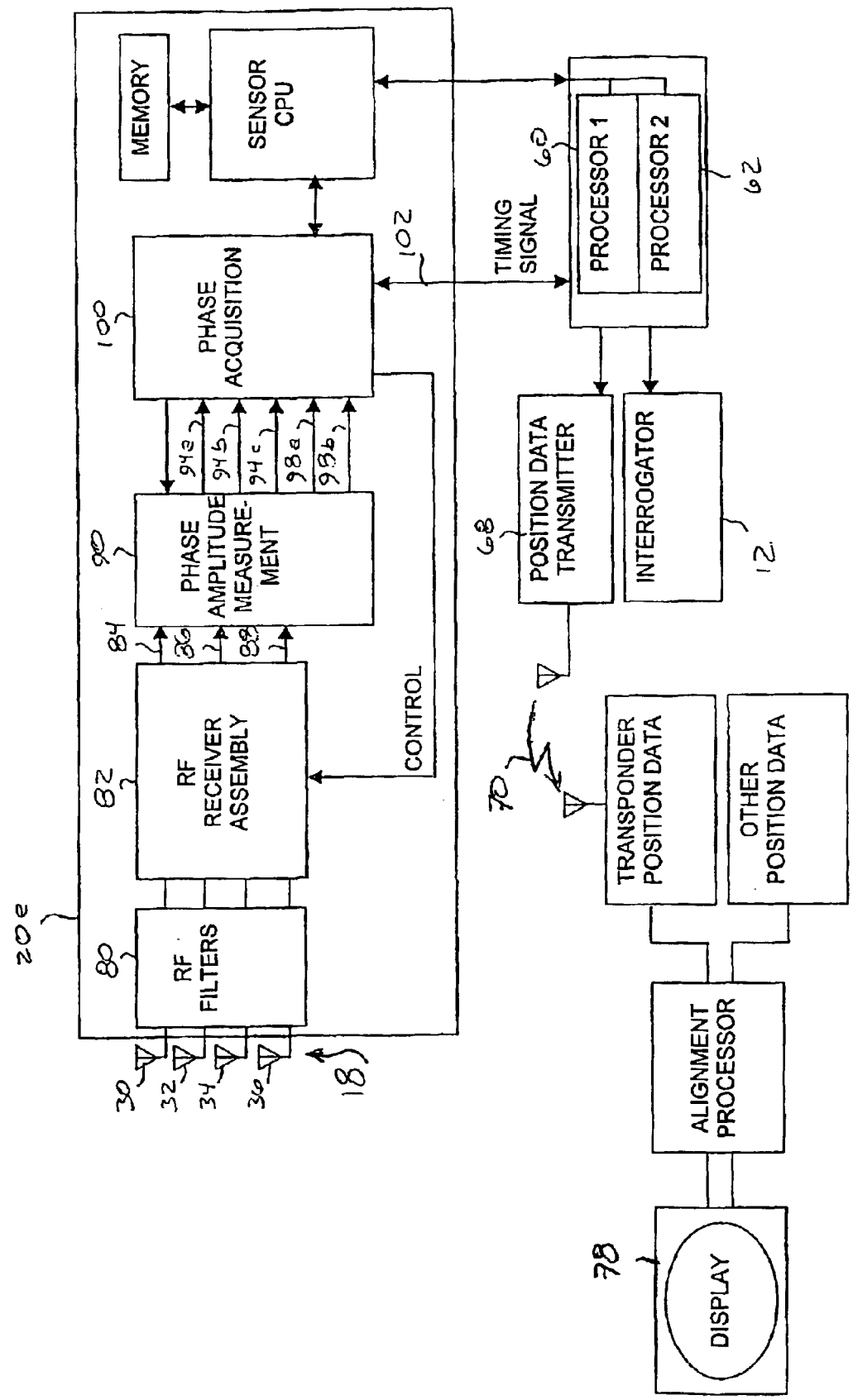
FIG. 2 is a functional block diagram of a system which suitably practices the present invention.

Referring to FIG. 2, each array 18 includes several individual antennas 30, 32, 34 and 36, a coherent reference demodulation signal, 90° phase shifting elements, and other circuitry necessary to extract the in-phase (I) component which is in phase with the reference, and the quadrature (Q) component which is 90° out of phase. Signal decomposition into in-phase and quadrature components, and the electronics required for implementation thereof, are well known to those skilled in the art. Knowledge of the in phase and quadrature signal components at each antenna in turn yields the phase of the signal 16 at each antenna 30, 32, 34 and 36.

The angle of arrival is determined from the differences in phase among pairs of antenna 30, 32, 34, 36. Arbitrarily defining the phase at antenna 30 as 0°, the phase at antenna 32 will be $2\pi(A\Delta L/\lambda)$, where $\lambda$ is the wavelength of the transponder reply (~0.27 m for 1090 MHZ), and $\Delta L$ is the difference in transponder signal path length with respect to antennas 30 and 32. $\Delta L$ is thus obtained from the signal phase measurements at antennas 30 and 32. The azimuth $\theta$ is given by:

$$\sin(\theta) = \frac{\Delta L}{d}$$

where $\theta$ is the azimuth angle, d is the individual antenna spacing, and $\Delta L$ is the path length difference.

The resolution of the angle of arrival method will improve with increasing spacing d. However, the angle of arrival method also yields multiple solutions of $\theta = \sin^{-1}(n\lambda/d)$, where n is an integer. This may be resolved by using differential range measurements from two antenna arrays. The range measurement is derived from TOA or amplitude measurements.

Referring back now to FIG. 1, the characteristics including azimuth angle and others as discussed above, are forwarded to two processors 60, 62 which independently calculate a position of the source transponder from the characteristics, thereby locating the responding vehicle 10. The calculated positions are provided to comparator 66 and tested to determine if the independently calculated solutions lie within allowable limits. If so, a position estimate of the vehicle is formatted and transmitted or broadcast from transmitter 68 to users such as other aircraft in flight or vehicles on the ground, and air traffic or ground controllers within operable range. While the illustrated implementation shows RF transmission 70, providing the position estimate to users may be accomplished by a variety of means, such as fiber optic cabling, Ethernet or other network protocols and the like without adversely affecting performance. It is now evident that the calculated positions may also be usefully combined or integrated with other detection means or systems 76 such as active radar surveillance systems, airport surface detection equipment, tracking subroutines, chart or map displays, operator-inserted overlays or data and the like for display 78. In one embodiment, position data from the present system is registered or overlaid with position data from other systems by selecting a particular target of interest with a known position, as such aligning position data from the plurality of systems.

With reference now to FIG. 2, a functional block diagram of components is illustrated. Four antennas 30–36 comprise the antenna array $18_a$. For simplicity antenna array $18_e$ is not depicted however those skilled in the art will appreciate that similar processing will occur on signals received on that array. Received reply signals from antennas 30–36, pass through filter 80 and are processed by the RF receiver assembly 82. By designating one of the antennas a reference 30 and measuring differential carrier phase between the reference antenna 30 and one of the remaining antennas 32, 34, 36 three different antenna array apertures are achieved and therefore, three different resolution measurements are possible, for example low, medium and high. An Intermediate frequency from the reference antenna 30 is output from the receiver assembly 80 on a dedicated receiver path 84. Signals from antennas 32, 34, 36 are multiplexed onto two RF receiver paths 86, 88 using switches within the RF receiver assembly 82 although those skilled in the art can envision equivalent mechanisms to transfer signals to the assembly. The Phase, Amplitude, and Frequency Measurement (PFM) 90 receives the intermediate frequency paths 84–88 from the RF receiver assembly 82, and provides log video signals 94a, 94b, 94c, and digitized phase data 98a, 98b to the Phase Acquisition Card (PAC) 100 for signal processing.

Two sets of digitized phase data are provided: the phase difference 98a between the reference and IF channel A (low, medium, or high channels 32, 34, 36); and the difference 98b between the reference and IF channel C (low, medium, or high channels). Log video of each of the three inputs 94a, 94b, 94c is also passed to the PAC 100. The PAC 100 additionally receives a start signal or synchronization timer 102 indicating an interrogation sequence 14 for use in making range calculations. Suitable mechanisms and methods for calculating range and even position based on range alone are known as exemplified in U.S. Pat. No. 5,017,930 issued to Stoltz et al. and incorporated herein by reference. Those skilled in the art will appreciate that the synchronization signal 102 may be provided by various forms of data communication such as fiber optic cabling, wireless transmission, conventional hard wiring and the like. Alternately, the synchronization may be implemented through internal mechanisms on the several components such as by internal clocks or GPS signals.

Sensor acquisition begins processing RF inputs from the antennas 30, 32, 34, 36 upon receipt of a start signal 102. Transponder reply signals 16 are analog processed and stored. Phase and frequency data is correlated with stop video signal acquisition data. All collected signal characteristic data passes to processors 60, 62, which calculate independent position solutions as more fully discussed below.

Figure 3:
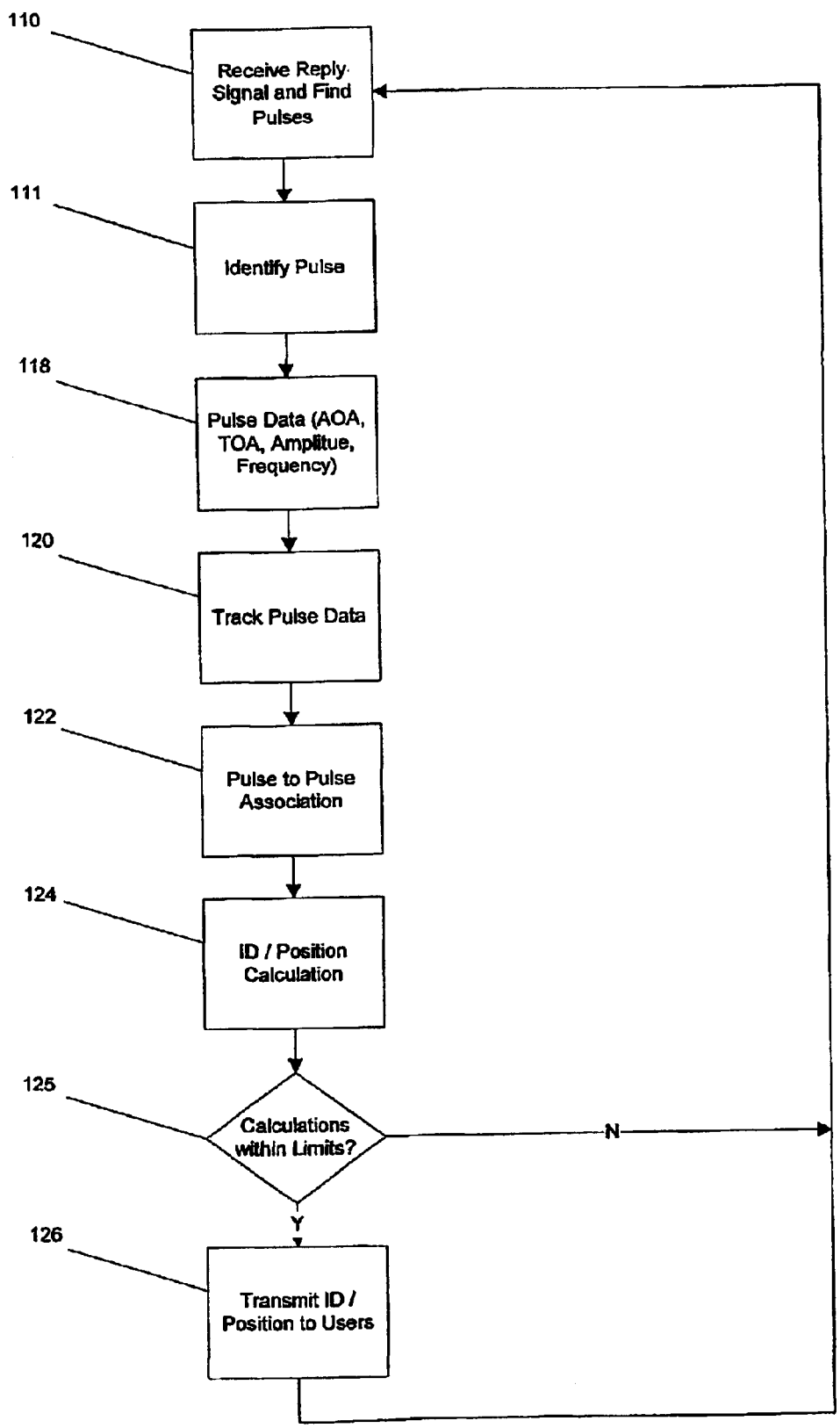
FIG. 3 is a flowchart illustrating a process which suitably practices the present invention.

With reference now to FIG. 3, an overview flowchart of steps which suitably practice the present invention are illustrated. An aircraft antenna transmits a reply signal 16 which is received on a ground based antenna arrays, $18_a$, $18_e$, and sent to processors 20 (FIGS. 1, 2). The processors receive the reply data and identify pulses as seen in step 110. The processor identifies pulses based on amplitude characteristics to detect a leading edge (LE) and trailing edge (TE) of the pulse as seen in step 111. If it is successful, then Pulse Data is extracted as seen in step 118. In addition to measurement data (AOA, TOA, Amplitude and Frequency), this also includes pulse information such as width and shape. Note that for Mode S squitter operation TOA measurements are not available because a reference or timing signal is not available. Tracks are maintained for the Pulse Data as seen in step 120. The processors then associate pulses over time using measurement and pulse information data as seen in step 122. This occurs for data from an individual antenna array along with data from other antenna arrays. The processors then make a final ID and position calculation, as seen in step 124, if there is enough data to resolve ID and position (i.e. multiple cycle) ambiguities. Environmental considerations can also be used to resolve position (i.e. eliminating a solution that clearly places an aircraft off airport property). Finally, the available data is tested against various limits (step 125) such as within accuracy requirements or identification confidence levels. If the data is acceptable, information is then forwarded to the transmitter 68 for broadcast to, and display within other vehicles in the monitored area A or other users, as seen in step 126.

Kalman filtering is used to improve the accuracy of the position estimate. The filtering improves the accuracy by using not only the most recent receiver measurements, but also the previously determined position, the statistical "reliability" of that position, and the statistical variance of the current measurements. The application of Kalman filtering to navigation systems is well understood by someone skilled in the art however, the following aspect of Kalman filter tuning is specialized to this invention. The process noise covariance matrix Q is usually a heuristic set to accommodate expected target maneuvers, but it may be set adaptively by more advanced formulations of the Kalman filter. The process noise covariance matrix Q is an "aging" matrix that allows acceleration events to occur in the state vector representing the aircraft dynamics. Usually one chooses an estimated Q and then "fine-tunes" it through computer simulation or flight test. A first approximation for Q is usually computed by considering the maximum acceleration that the aircraft is likely to perform.

Referring back to FIG. 2, the position information in one embodiment of the present invention is incorporate, aligned and displayed with other position data. Position information is received on a track of interest such as a particular aircraft or vehicle, a reference point and the like. Typically the track data will be extracted from the plurality of position data received by code, or other identifying means. Other position data is then aligned or registered with the transponder data and the results are displayed to a user.

Figure 4:
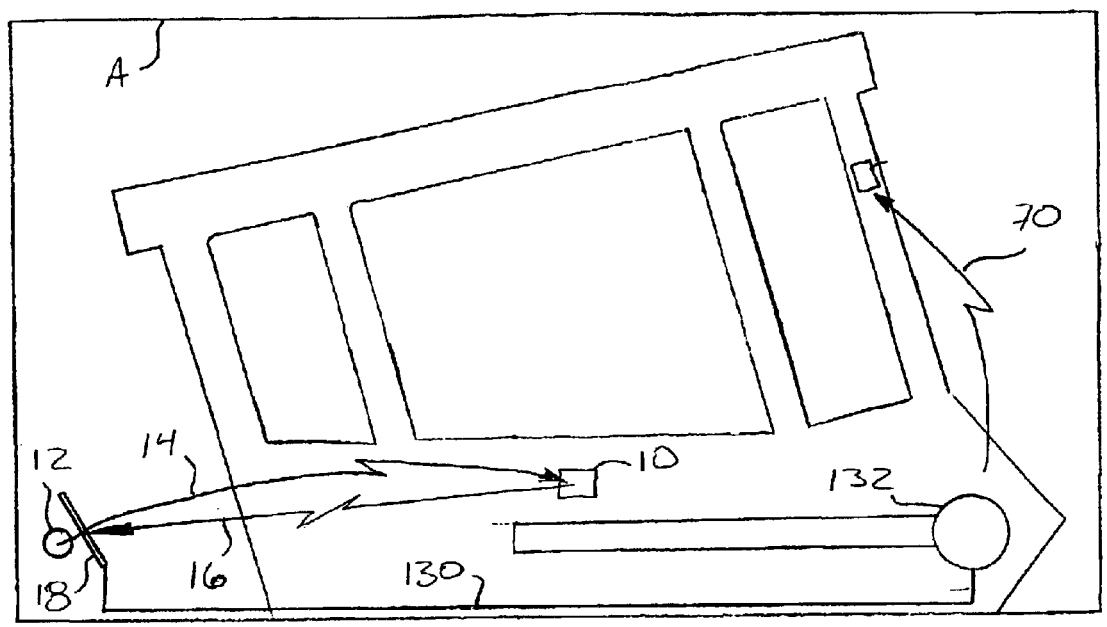
FIG. 4 illustrates an exemplary application of the transponder position determination in a ground based environment.

With reference to FIG. 4 an embodiment for airport or other surface detection and tracking environment is illustrated. An aircraft 10 or other vehicle with an associated transponder (not shown) is interrogated by interrogator 12. Depending upon the environment, the interrogation rate may be fairly low, especially as compared with interrogation rates used for monitoring airborne aircraft. For example, ground vehicles at an airport are usually moving relatively slowly over fairly open areas, so relatively long interrogation intervals, or reply intervals may be used. Additionally, the above discussed frequencies of interrogation and reply may be different in the surface environment to de-conflict airborne or other signals. The reply transmission 16 is received on receiver array 18. In the illustrated embodiment a single azimuth only array may suffice to provide an unambiguous angle of bearing to the vehicle. The unambiguous angle of bearing coupled with range estimation processing, as discussed above are sufficient to roughly position the vehicle 10. In the illustrated example, a hard wired cable 130 links the array to displays in the tower 132 which broadcasts 70 the calculated position over an RF or optical link across the surveillance area A to other vehicles in range. Those skilled in the art can now appreciate that additional angle and range processing arrays may be located at other locations around the surveillance area A to provide a more robust, fault tolerant system with increased precision. Moreover, those skilled in the art can appreciate that various combinations of arrays may also be and desirable in other situations. For example, a single range finder coupled with several angle determining systems may be desirable in some locales while a positioning system comprising only range determination (or alternately angle determination) may be desirable in others.

It is also envisioned that other detecting systems 76 (FIG. 1) such as surface detection equipment be incorporated into the system, for example, by registering both surface detection radar and transponder position for display 78 or transmission to surrounding craft. Alternately, the radar display may be processed by a radar object processor as is known, to extract the location of detected objects. The detected objects may then be compared with transponder locations to determine if the object is unidentified or associated with an existing or new transponder track. The radar objects may then also be appropriately marked in the display 78.

Figure 5A:
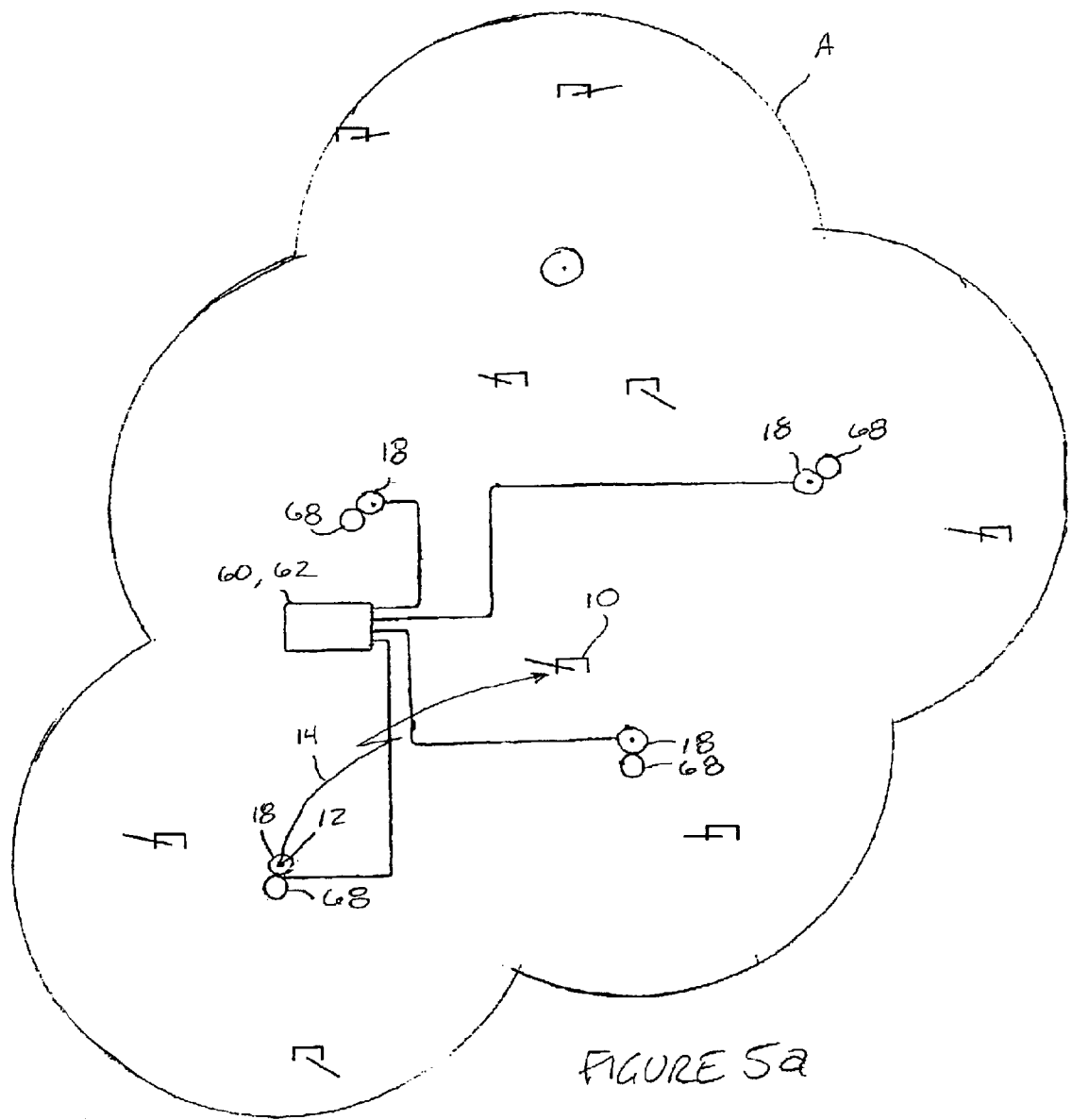
FIGS. 5a, 5b and 5c illustrate an exemplary application of the transponder position determination in an airborne environment.
Figure 5B:
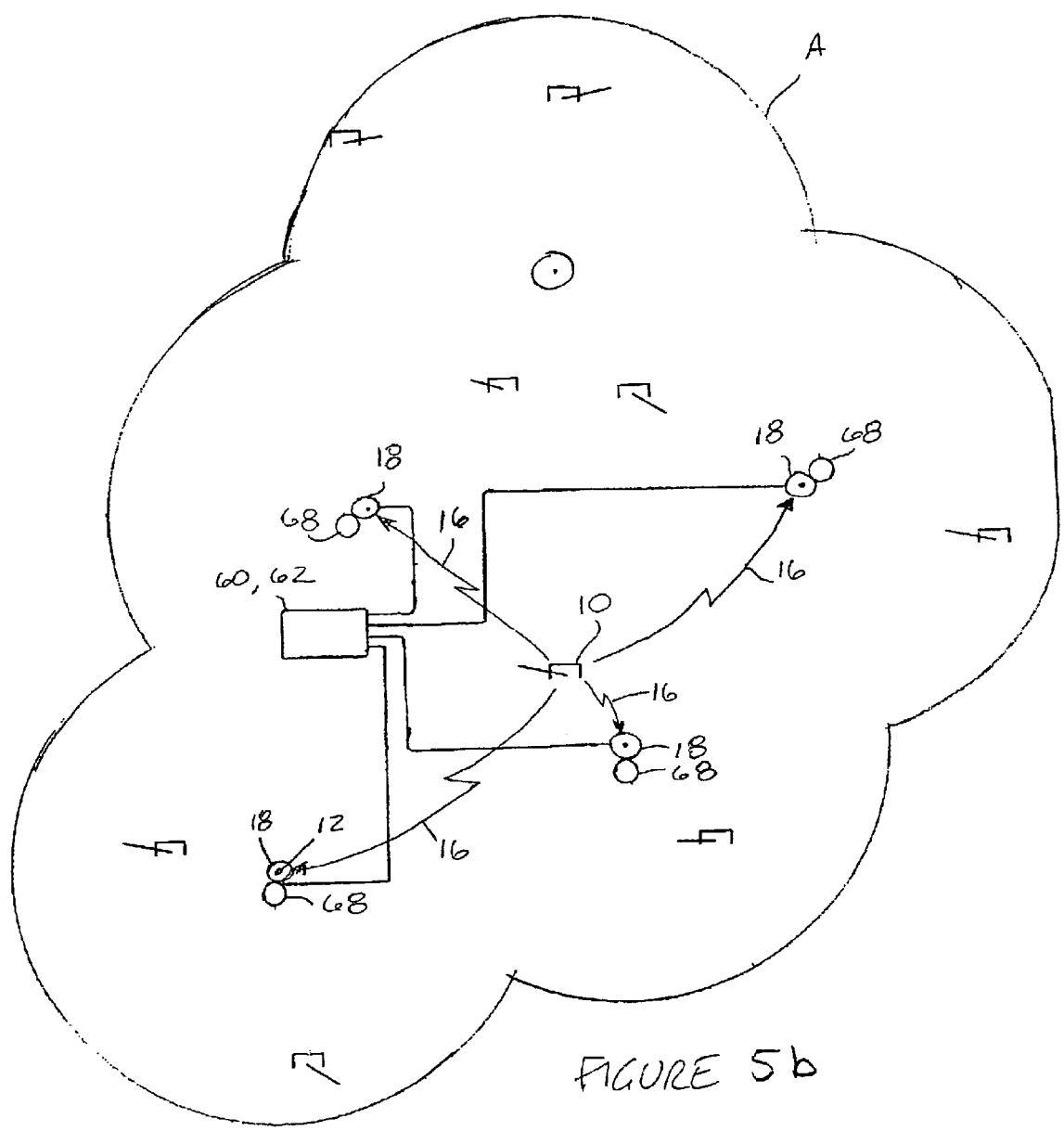
Figure 5C:
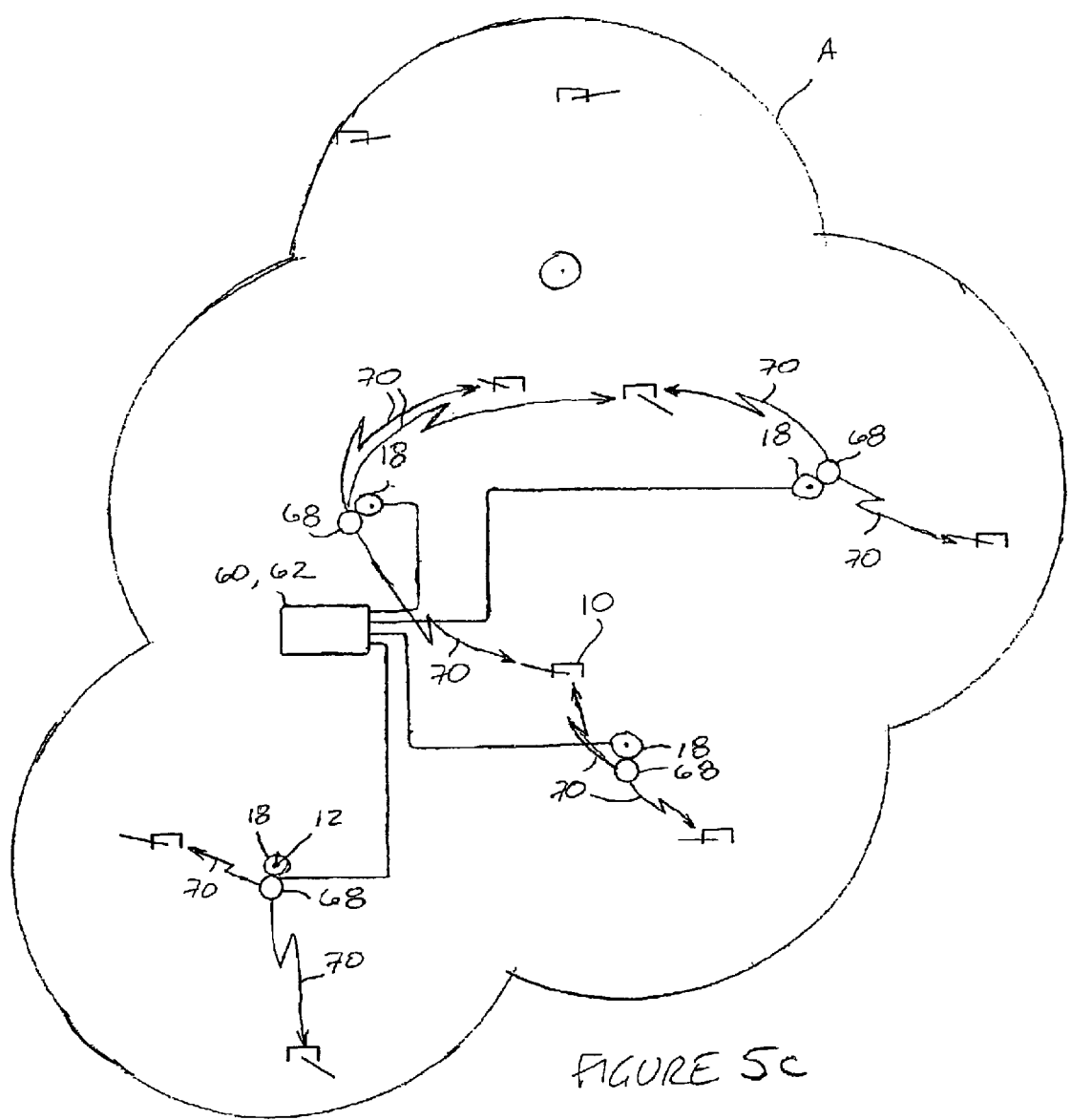

With reference now to FIGS. 5a–5c, an embodiment for an in-flight surveillance system is illustrated. Referring first to FIG. 5a, interrogator 12 transmits an interrogation signal 14 which is received by the cooperatively equipped aircraft 10 transiting surveillance area A. Referring now to FIG. 5b, a single reply transmission 16 from aircraft 10 is received by a plurality of geographically spaced receivers 18. In the present example, the four illustrated receiver arrays 18 in range of the transponder reply 16 each calculate angle of arrival in both azimuth and elevation. The elevation calculation may involve Mode C interrogations, which return the aircraft's altitude instead of ID. Additionally, the originating interrogating station 12 coupled with its local receiver array 18 determines range. The stations are in data communication with position processors 60, 62 which combine the respective data or signal characteristics to determine a position from which the reply signals 16 originated. Referring now to FIG. 5c, this calculated position is forwarded to transmitters 68 associated with each receiver array 18 in the illustrated example although they could be elsewhere located. The transmitters 68 then broadcast 70 the calculated position throughout the surveillance area A to other aircraft as well as the replying aircraft 10, as illustrated. Again, those skilled in the art can now envision various combinations of range and angle processors usable to determine unambiguous positions. Moreover, the calculated position may then be converted into a format for display 78, integration with other systems 76 and the like for use also by air traffic controllers or others.

As can now be appreciated, the position broadcasts include position data on all cooperatively responding aircraft in the surveillance area. Thus, if such a cooperatively responding aircraft also has the capability to receive and process the broadcast position data, a navigational backup or integrity monitor is provided by the transponder surveillance system. In other words, such an aircraft can compare or register the position information from organic navigation equipment such as INS, GPS, and the like, to the position information provided by the broadcast position data. As such, overall confidence of the navigational accuracy is increased, and extra redundancy is provided.

Receipt and decoding of the transponder reply may further provide additional useful content to improve the situational awareness of both controllers and flight crew. For example, many aircraft transponders include identification codes in the transponder reply. These codes may be advantageously used by a vehicle identification processor to derive additional vehicle information, such as aircraft type, flight plan, maintenance requirements, and the like, which may be included in display 78.

The invention has been described with reference to the preferred embodiments. Obviously, modifications and alterations will occur to others upon reading and understanding the preceding detailed description it is intended that the invention be construed as including all such modifications and alterations insofar as they come within the scope of the appended claims or the equivalents thereof.

Having thus set forth the preferred embodiments, the invention is now claimed to be:

1. A method of tracking aircraft in a surveillance area comprising:

receiving signals from aircraft in the surveillance area at a frequency, the signals being received on an plurality of antenna arrays;

determining a plurality of azimuth angles of the received signals relative to each array from characteristics of the signals;

calculating a position indicative of an origin of the signals from data including the determined angles; and providing data representative of a plurality of calculated positions to vehicles in the surveillance area.

2. The method of tracking aircraft in a surveillance area as set forth in claim 1, where the received signals are transmitted from the aircraft in response to interrogation signals at a second frequency.

3. The method of tracking aircraft in a surveillance area as set forth in claim 1, further comprising:

receiving the provided data representative of a plurality of calculated positions;

extracting from the received data a position corresponding to a target of interest; and registering the extracted position of the target of interest with another position for the target of interest determined from other sensors.

4. The method of tracking aircraft in a surveillance area as set forth in claim 1, wherein the determining a plurality of angles comprises:

receiving the reply signal on a reference antenna in the array;

receiving the reply signal on another antenna in the array; and determining a difference in phase between the signal received on the reference antenna and the signal received on the other antenna.

5. The method of tracking aircraft in a surveillance area as set forth in claim 1, further comprising:

calculating an elapsed time between transmitting an interrogation signal and receiving the reply signal; and determining a range based on the elapsed time.

6. A method of detecting aircraft in an area within operable range of an interrogator transmitting an interrogation signal at a first frequency, the aircraft having a transponder transmitting a reply signal at a second frequency in response to the interrogation signal, the method comprising:

detecting a pulse based on amplitude characteristics of the reply signal;

measuring signal quantities of the detected reply signal, the signal quantities selected from the set of differential phase, time of arrival, frequency, pulse width, and pulse shape;

measuring pulse characteristics of the detected reply signal, the pulse characteristics selected from the set of shape and width; and using the measured signal quantities and pulse characteristics from multiple reply signals and environmental constraints to associate measurements and compute a unique identification and position.

7. A method for detecting and identifying a pulse modulated transponder reply signal having a plurality of associated data pulses comprising the steps of:

producing a video signal for each received pulse;

sampling amplitude, angle of arrival and frequency of the reply pulse;

pulse amplitude and angle processing the reply pulse to determine pulse time of arrival;

track processing the sampled data to achieve track states on time, angle, amplitude and frequency for each signal data pulse;

correlation processing of the track states to associate data pulses from a single transponder reply; and establishing a position based on the correlated track states.

8. An apparatus which detects aircraft in an area within operable range of an interrogator transmitting an interrogation signal at a first frequency, the aircraft having a transponder transmitting a reply signal at a second frequency in response to the interrogation signal, the apparatus comprising:
 a) an angle determining apparatus comprising:
  i) a plurality of antennas disposed as an array, and
  ii) a phase calculator which calculates a difference in phase of the reply signal between a first receive channel including a first antenna, and a second receive channel including a second antenna;
 b) a range determining apparatus comprising:
  i) a synchronized timer which determines a time between the interrogation signal and receipt of the transponder reply signal at each of the plurality of antennas, and
  ii) a range estimator which estimates a range based on the determined time between the interrogation signal and receipt of the transponder reply signal;
 c) a position processor which determines a position based on the calculated difference in phase and the estimated range; and
 d) a transmitter to transmit data including positions representative of a plurality of aircraft in the area.

9. The apparatus as set forth in claim 8, further comprising:
 a second angle determining apparatus comprising:
  a plurality of antennas disposed as an array; and
  a phase calculator which calculates a second difference in phase of the reply signal between a first receive channel including a first antenna, and a second receive channel including a second antenna; wherein the second angle determining apparatus is in data communication with the position processor which determines a position based on the calculated difference in phase, the second calculated difference in phase and the estimated range.

10. A system for locating a vehicle within a monitored area, comprising:
 at least one receiver array which receives a reply signal having a frequency of substantially 1090 mHz transmitted by a transponder associated with the vehicle;
 a range processor which calculates a range based on the received reply signal;
 an angle of arrival processor which calculates an angle of the received reply signal from an extracted in-phase (I) component and quadrature (Q) component of the signal; and
 a position processor which calculates a vehicle position based upon the range and the angle.

11. The system as set forth in claim 10, where the range processor comprises:
 a time of arrival processor which calculates an elapsed time between a reference time and a time the reply signal is received at the receiver array, where the range is determined from the elapsed time at the receiver.

12. The system as set forth in claim 11, where the reference time comprises receipt of a timing signal at the receiver.

13. The system as set forth in claim 10, wherein the receiver array comprises:
 two adjacent closely spaced antenna elements to provide a coarse azimuth calculation; and
 two non-adjacent antenna elements linearly disposed with the adjacent elements to provide a fine azimuth calculation.

14. A method of determining a position of a cooperative object in a monitored area, the method comprising:
 receiving an encoded reply signal at a frequency from the cooperative object transmitted in response to an interrogation signal at another frequency;
 calculating a line of bearing from characteristics of the received reply signal, the line of bearing relative to a plurality of antenna elements forming an array;
 calculating a second solution based on received of the reply signal; and
 determining a position based on the line of bearing and the second solution.

15. The method as set forth in claim 14, where the calculating a second solution comprises:
 calculating a second line of bearing from characteristics of the received reply signal on a second plurality of antenna elements.

16. The method as set forth in claim 14, where the calculating a second solution comprises;
 calculating a range from an elapsed time between a reference and a time of receipt of the reply signal.

17. The method as set forth in claim 14, further comprising:
 displaying the position to a user.

18. The method as set forth in claim 14, further comprising:
 conveying a plurality of calculated positions to a vehicle.

19. The method as set forth in claim 14, where the characteristics of the received reply signal from which the line of bearing is calculated include a spatial phase distribution of the reply signal.

* * * * *

UNITED STATES PATENT AND TRADEMARK OFFICE
CERTIFICATE OF CORRECTION

PATENT NO. : 6,816,105 B2
DATED : November 9, 2004
INVENTOR(S) : Winner et al.

It is certified that error appears in the above-identified patent and that said Letters Patent is hereby corrected as shown below:

Title page,
Item [75], Inventors, please change "Karl Winner, 52 Poplar Dr., Home Valey, WA (US) 98648; Benjamin Khen, 2003 Sherman St., Hood River, OR (US) 97031" to -- Karl Winner, 52 Poplar Dr., Home Valley, WA (US) 98648; Benjamin Kuehn, 2003 Sherman St., Hood River, OR (US) 97031 --

Signed and Sealed this

First Day of March, 2005

JON W. DUDAS
*Director of the United States Patent and Trademark Office*